(12) United States Patent
Smith et al.

(10) Patent No.: US 7,411,505 B2
(45) Date of Patent: Aug. 12, 2008

(54) SWITCH STATUS AND RFID TAG

(75) Inventors: Joshua R. Smith, Seattle, WA (US);
Anthony Lamarca, Seattle, WA (US);
Matthai Philipose, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 11/351,192

(22) Filed: Feb. 8, 2006

(65) Prior Publication Data

US 2006/0139180 A1    Jun. 29, 2006

Related U.S. Application Data

(63) Continuation-in-part of application No. 11/145,368, filed on Jun. 3, 2005, now Pat. No. 7,336,184.

(60) Provisional application No. 60/612,881, filed on Sep. 24, 2004.

(51) Int. Cl.
*G08B 13/14* (2006.01)

(52) U.S. Cl. ............................. 340/572.4; 340/572.1

(58) Field of Classification Search ............. 340/572.1, 340/572.3, 572.4, 572.5, 572.6, 572.7, 539.13, 340/545.5, 571, 505, 10.4, 10.42; 235/472.01, 235/472.02
See application file for complete search history.

(56) References Cited

U.S. PATENT DOCUMENTS

| 5,764,138 | A * | 6/1998 | Lowe .......................... 340/447 |
| 6,286,762 | B1 * | 9/2001 | Reynolds et al. ........ 235/472.01 |
| 6,286,763 | B1 * | 9/2001 | Reynolds et al. ........ 235/472.01 |
| 6,318,636 | B1 * | 11/2001 | Reynolds et al. ........ 235/472.01 |
| 7,089,099 | B2 * | 8/2006 | Shostak et al. ................. 701/32 |
| 7,098,794 | B2 * | 8/2006 | Lindsay et al. ............ 340/572.3 |
| 7,151,455 | B2 * | 12/2006 | Lindsay et al. ............ 340/572.3 |

* cited by examiner

*Primary Examiner*—Van Trieu
(74) *Attorney, Agent, or Firm*—Trop, Pruner & Hu, P.C.

(57) ABSTRACT

One or more switches may be coupled to a radio frequency identification (RFID) tag, so that the response of the RFID tag indicates the state of the switch(es). The RFID tag and the switch(es) may be coupled together in various ways so that the state of the switches affects the response of the RFID tag to an RFID reader.

4 Claims, 10 Drawing Sheets

SWITCH STATUS AND RFID TAG

RELATED DOCUMENTS

This application is a continuation-in-part of non-provisional application Ser. No. 11/145,368, filed Jun. 3, 2005 now U.S. Pat. No. 7,336,184, which is derived from provisional application 60/612,881, filed Sep. 24, 2004, and this application claims priority to those dates for all applicable subject matter.

BACKGROUND

Radio frequency identification (RFID) technology is increasingly used to identify nearby devices electronically without requiring line-of-sight access or human intervention. A key advantage of this technology is that many RFID tags (e.g. passive RFID tags) can operate solely from the energy of an incoming signal and therefore don't require a battery for power. However, conventional passive RFID tags are somewhat limited in capability. Among other shortcomings, the orientation and/or movement of an RFID tag is not usually detectable by the associated RFID reader. This limits the applications in which RFID technology is deemed useful.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
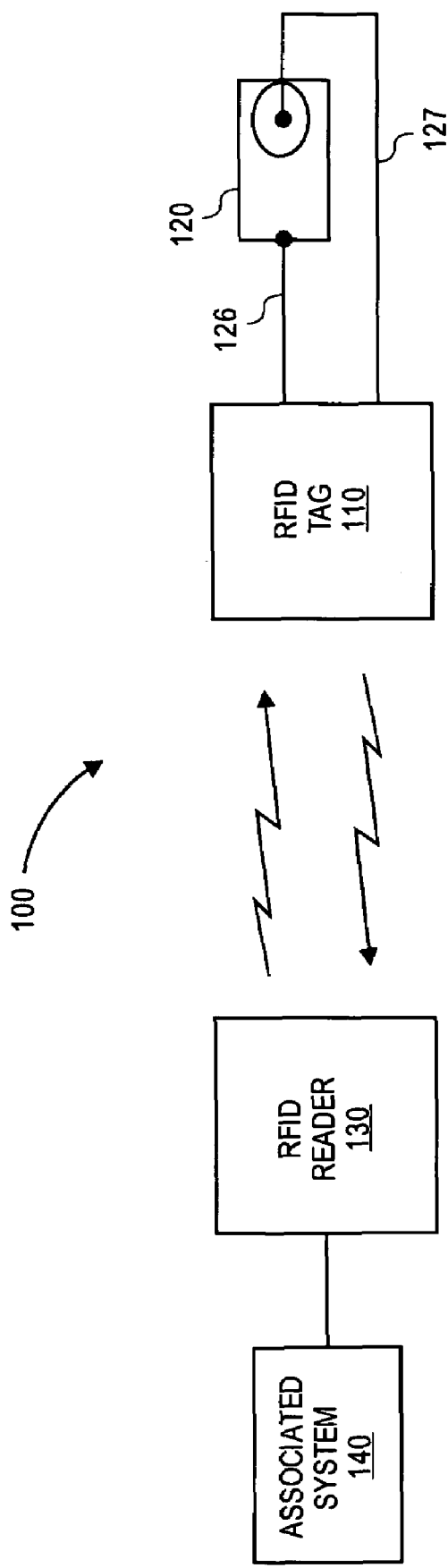
FIG. 1 shows an RFID system using an inertially controlled switch, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, the different embodiments described may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to perform the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

In the context of this document, an RFID tag may be comprised of 1) an RFID antenna (to transmit/receive from/to the RFID tag), and 2) an RFID tag circuit comprising an identification (ID) circuit to hold the tag's ID number, and a modulation circuit to deliver that ID number to the antenna in a useful form. Also, 'passive' RFID tags (non-battery powered RFID tags) may comprise a power circuit to accumulate incoming energy received by the antenna and use that energy to power the RFID tag circuit. When used in conjunction with an RFID tag, the term 'transmit' may include reflecting from the antenna a modulated version of the incoming signal. An RFID reader may poll the RFID tag by transmitting the signal that energizes the RFID tag, and may receive the response transmitted by the RFID tag. Depending on the RFID technology being used, a poll may be a signal that can be picked up by any properly configured RFID tag within range, or it may include an addressed signal that is responded to only by the addressed RFID tag(s).

In some embodiments of the invention, the data transmitted by an RFID tag may represent the state of one or more switches. In some embodiments a switch may comprise a switch that is activated by inertial force (whether created by motion or gravitational force) that is above a threshold amount. However, in other embodiments, a switch may comprise a mechanically-activated switch (whose state may be changed by a mechanical force), a magnetically-activated switch (whose state may be changed by a magnetic force), or a thermally-activated switch (whose state may be changed by crossing a temperature threshold).

FIG. 1 shows an RFID system using an inertially controlled switch (ICS), according to an embodiment of the invention. In the illustrated system 100, an RFID reader 130 may poll an RFID tag 110 by transmitting an appropriate signal to the RFID tag 110. In some embodiments the RFID tag may respond by transmitting a response that includes an identification code for the RFID tag. The contents of the response may also include one or more bits indicating the status of ICS 120, which may be connected to the RFID tag 110 by electrical conductors 126 and 127. The RFID reader 130, and/or an associated system 140, may perform various operations, depending on the contents of the received response. The RFID tag and ICS are generally referred to herein as separate items, but may also be packaged as an integrated unit. The associated system 140 may be coupled to the RFID reader directly or indirectly, locally or remotely, wired or wirelessly, or may be combined with the RFID reader into a single integrated unit.

An ICS may be an electrical switch whose state (electrically open or electrically closed) is dependent on the inertial force sensed along a particular axis of the ICS. Inertial force, as used herein, is not synonymous with momentum, but may be sensed as gravitational force, or a component of gravitational force if the sensitive axis of the ICS is not parallel to the direction of gravitational force. Inertial force may also be sensed as acceleration, for example, as a change of velocity along a straight line, as a change of direction, or as a combination of the two. The ICS's described herein may generally have a binary state, e.g., the switch is either open or closed. An ICS may be designed to operate in various ways. In the illustrated ICS, a conductive liquid such as mercury (but which could be other liquids, such as but not limited to gallium or an electrolytic solution) may be contained within a conductive chamber. The mercury is depicted as an oval, due to the presumed effects of surface tension and gravity, but this is only an illustration and the mercury may take any feasible shape. If the mercury is at the right end of the chamber as shown ('right' with reference to the drawing), it may create an electrical connection between the electrical conductor 127 and the chamber case, which is in turn connected to the RFID tag 110 by electrical conductor 126. In this orientation the mercury would therefore complete an electrical connection between conductors 126 and 127, which could be sensed by RFID tag 110. If the mercury is at the left end of the chamber, there would be no electrical connection between electrical conductors 126 and 127, a condition that could also be sensed by the RFID tag 110. Depending on inertial forces, such as the force of gravity or a force created by acceleration, the mercury could be at either end of the chamber, and the state of an inertial force along the axis of the chamber could therefore be detected. That state may be derived from the response of the RFID tag to a poll by an RFID reader.

Some versions of an ICS may be designed to exhibit hysteresis effects (for example by placing a 'hill' between the two ends of the chamber), so that the inertial force in either direction will have to exceed a positive threshold level before the mercury will move to the opposite end and the electrical connection will change states. Depending on the orientation of the ICS and the particular design of the ICS, a variety of ICS's may be produced with differing amounts of sensitivity, threshold values, and hysteresis effects. Although the examples described involve the use of a conductive liquid to close or open a conductive path, other types of ICS may also be used with an RFID tag in the various embodiments of the invention. Such examples may include, but are not limited to, such things as: 1) a mechanical spring and post, 2) a pendulum, 3) a rolling conductive ball, 4) a sliding conductor, 5) a micro-electronic mechanical device, 6) etc. In some embodiments, the ICS may effectively be a 'latching' switch, so that once triggered, it retains its new state even if the inertial force subsequently changes to the opposite direction (such a latching effect may be achieved in any feasible manner, such as but not limited to a conductive element that would be broken by the inertial force). A latching ICS may be used to identify a previous change of state, rather than simply identify a current state, even if the change occurred when the RFID tag was not active.

Figure 2:
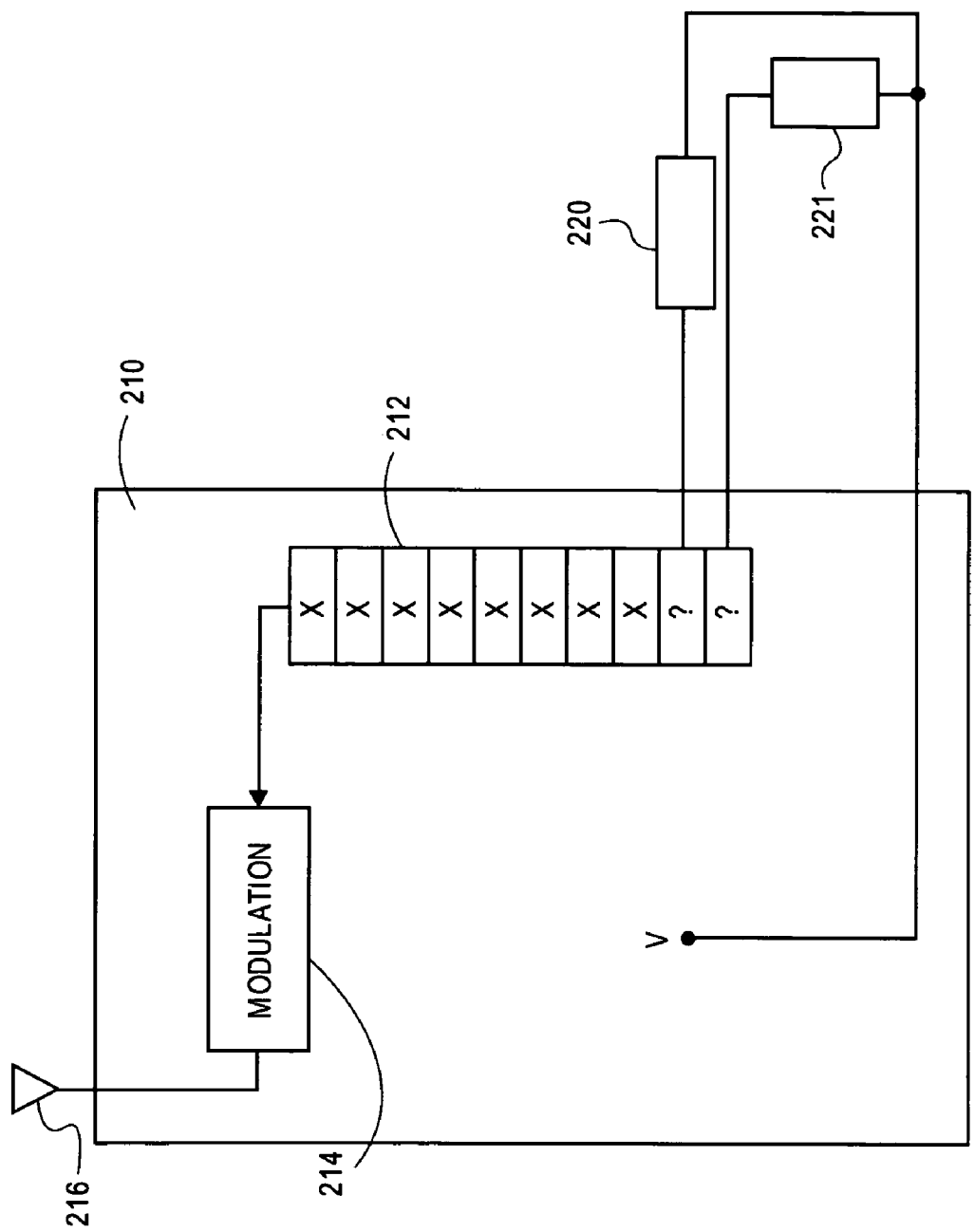
FIG. 2 shows an RFID tag coupled to at least one inertially controlled switch, according to an embodiment of the invention.

FIG. 2 shows an RFID tag coupled to at least one ICS, according to an embodiment of the invention. In the illustrated embodiment, the RFID tag may comprise an antenna 216 and an RFID tag circuit 210, which in turn may comprise a shift register 212 to contain the identification number (represented by X's) of the RFID tag, and a modulation circuit 214 to impose that identification number onto the radio frequency signal that is transmitted from antenna 216. The shift register may also contain additional bits, whose state (shown as question marks) may depend on the state of ICS 220 and ICS 221, respectively. The content of these two bits may be transmitted along with the identification number of the RFID tag. The illustrated embodiment shows two ICS switches, oriented at right angles to each other, but other embodiments may contain any feasible quantity of one or more ICS switches, oriented in any feasible directions, that are coupled to an appropriate number of bits in the shift register. With the embodiment shown, the code transmitted by RFID tag 210 may contain not only the identification number, but also one or more bits that represent the inertial state of the associated switches. The switches are shown coupled to a voltage source V, to be provided by the RFID tag, but other arrangements may also be used. In a passive RFID tag, in which the voltage V of the RFID tag is provided by the received energy from an incoming signal, the ICS switches may be powered by the same received energy, thus allowing the combination of RFID tag and ICS's to operate without battery power. Although the illustrated embodiment shows the voltage source being coupled through the ICS's to the shift register, other embodiments may use other arrangements (e.g., the shift register might be coupled to a ground connection through the ICS's, with voltage pull-ups to provide a voltage source).

Although the embodiments of FIG. 2 and subsequent figures show each individual ICS being used as an individual control or data point, other embodiments (not shown) may use multiple ICS's in various Boolean logic combinations to produce a single control or data point. Such embodiments may combine multiple ICS's in any feasible fashion, such as but not limited to: 1) combining their outputs into an OR circuit, 2) combining their outputs into an AND circuit, 3) combining their outputs into a combination of OR and AND circuits.

Figure 3:
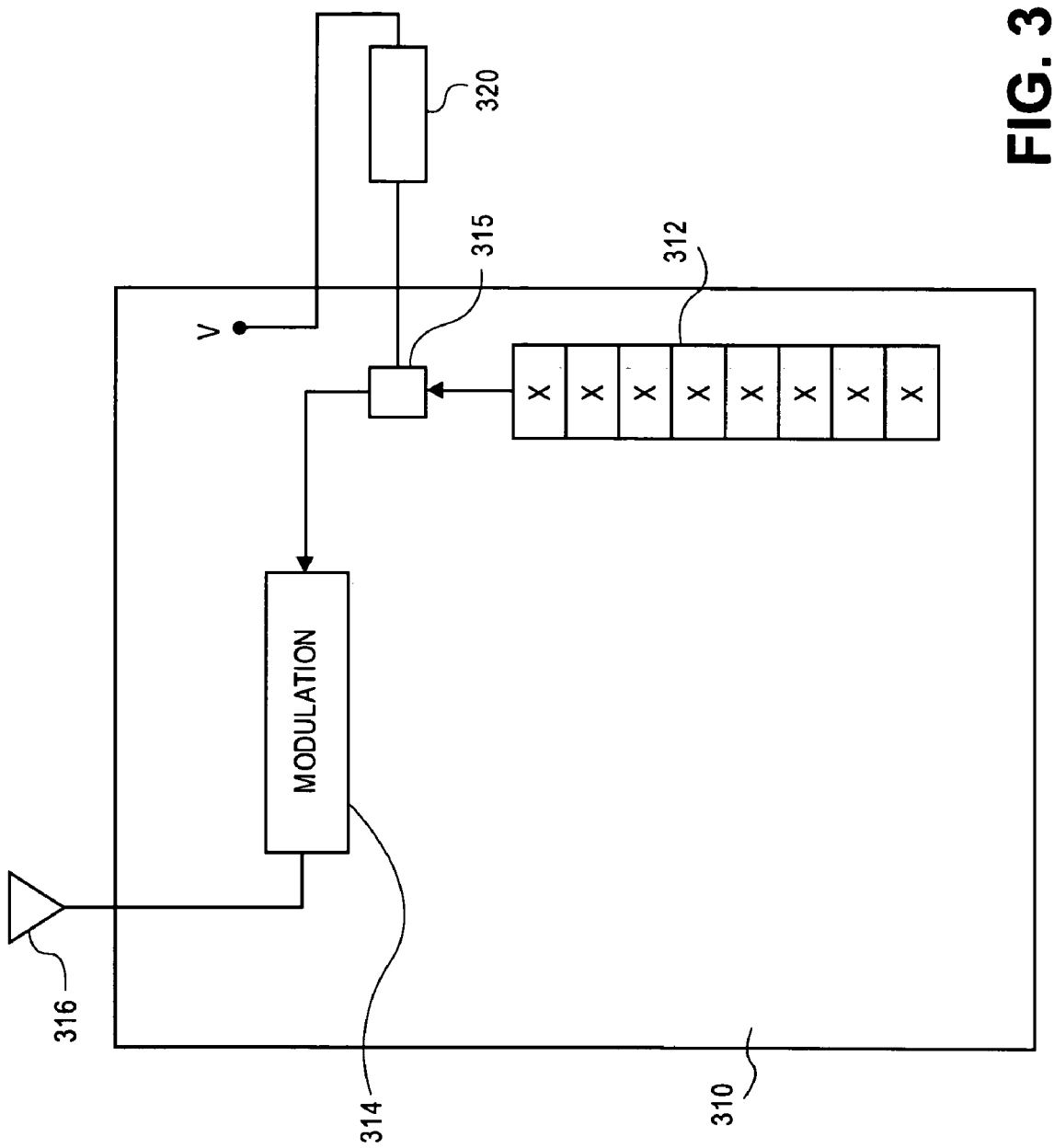
FIG. 3 shows an RFID tag coupled to an inertially controlled switch, according to another embodiment of the invention.

FIG. 3 shows an RFID tag coupled to an ICS, according to another embodiment of the invention. The illustrated embodiment of FIG. 3 may be similar in many ways to the illustrated embodiment of FIG. 2, with similar components in antenna 316, modulation circuit 314, and voltage source V. ICS 320 may be similar to ICS 220. But the embodiment of FIG. 3 may use the state of ICS 320 to control whether the contents of shift register 312 are transmitted at all by RFID tag 310. The illustrated embodiment shows the state of ICS 320 controlling a switch 315 that either passes the contents of shift register 312 on to the modulation circuit 314, or blocks those contents from being passed on the modulation circuit 314. In a similar embodiment, such a control might also be implemented by controlling the clock signal that enables the contents of shift register 312 to be shifted.

Figure 4:
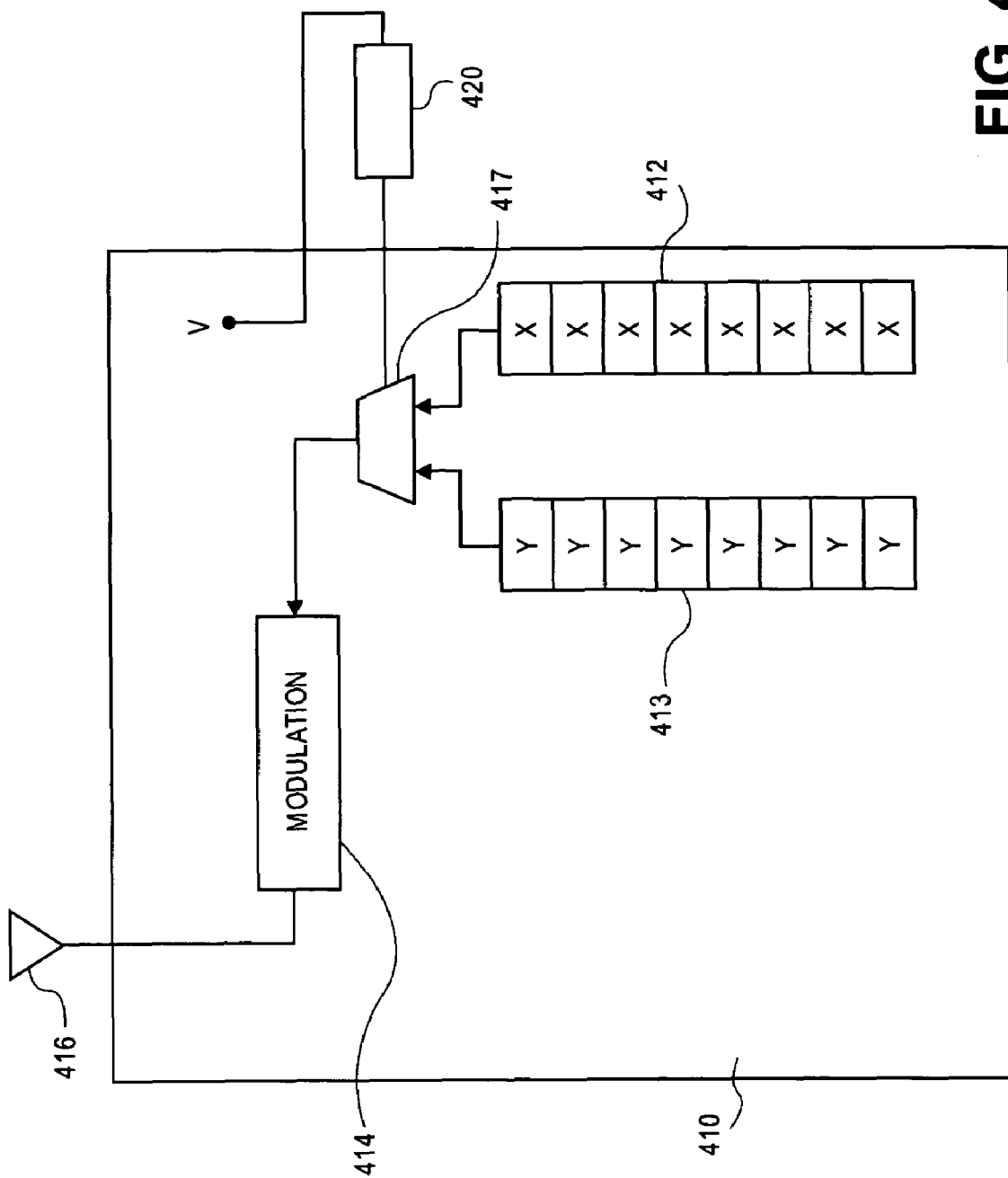
FIG. 4 shows an RFID tag coupled to an inertially controlled switch, according to still another embodiment of the invention.

FIG. 4 shows an RFID tag coupled to an ICS, according to still another embodiment of the invention. The illustrated embodiment of FIG. 4 may be similar in many ways to the illustrated embodiment of FIG. 3, with similar components in antenna 416, modulation circuit 414, and voltage source V. ICS 420 may be similar to ICS 320. But RFID tag 410 may comprise two shift registers 412, 413, each containing different identification numbers. The state of ICS 420 may be used to control a multiplexer 417, which in turn may control which of the two identification numbers is to be transmitted. Although the illustrated embodiment uses a single ICS to select between two shift registers, other embodiments may use multiple ICS's, and the RFID tag may have more than two such shift registers. As previously described, various combinations of OR circuits, AND circuits, and/or other Boolean logic circuits may be used to combine the outputs of the various ICS's to control which of multiple shift registers is selected.

Figure 5:
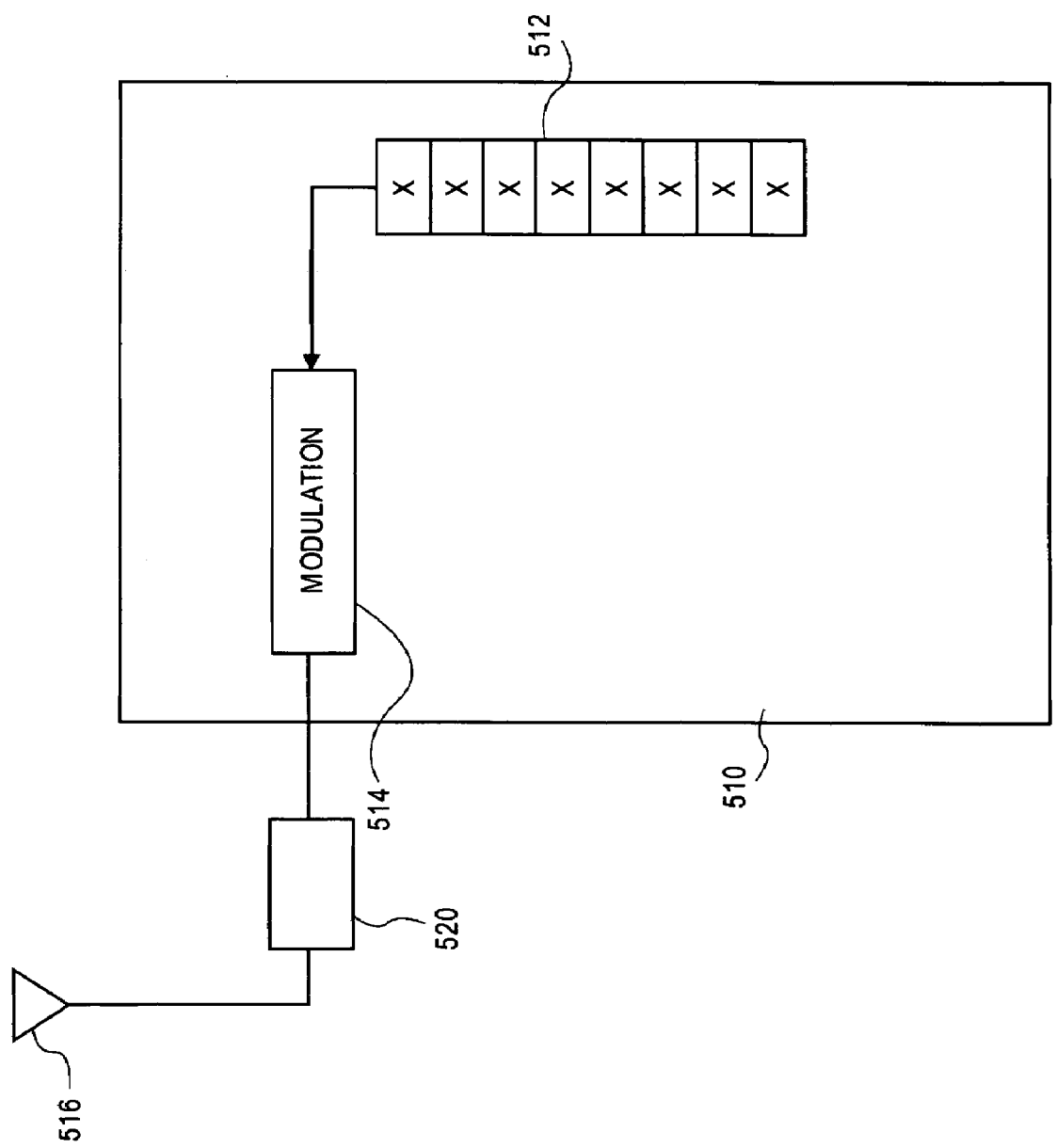
FIG. 5 shows an RFID tag coupled to an inertially controlled switch, according to still another embodiment of the invention.

FIG. 5 shows an RFID tag coupled to an ICS, according to still another embodiment of the invention. The illustrated embodiment of FIG. 5 may be similar in many ways to the illustrated embodiment of FIG. 3, with similar components in antenna 516, modulation circuit 514, and shift register 512. ICS 520 may be similar to ICS 320. However, in the embodiment of FIG. 5, the ICS may be electrically coupled between RFID tag 510 and antenna 516, so that even if the RFID tag circuit is operating, the identification number will not be transmitted if the ICS is in a state that disconnects the antenna. The embodiment of FIG. 5 may be relatively easier to implement with conventional RFID tags, in which the connection between the RFID tag circuit and the RFID antenna may be accessible without making any design changes to the RFID tag circuit.

Figure 6:
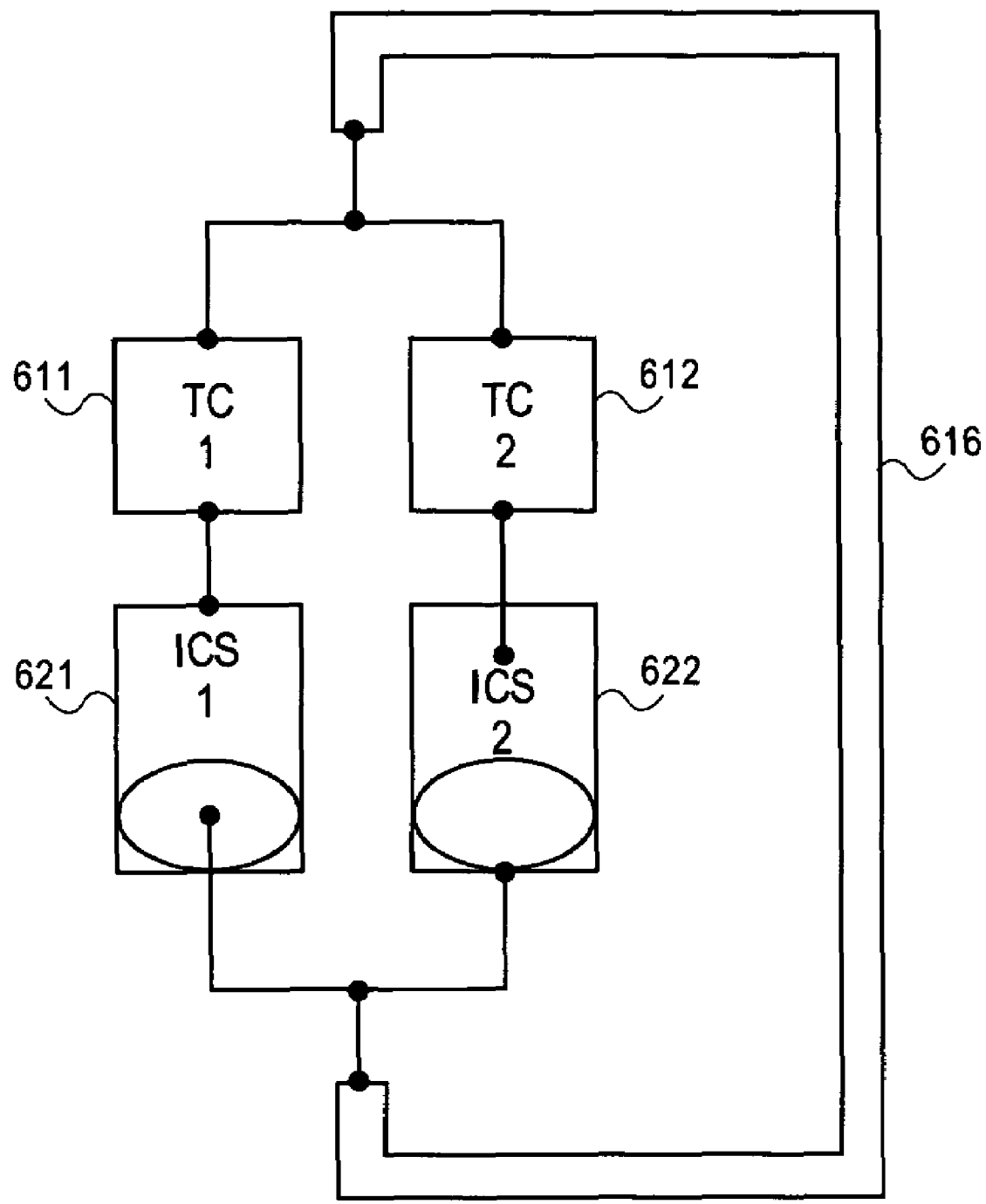
FIG. 6 shows multiple RFID tags coupled to multiple inertially controlled switches, according to an embodiment of the invention.

FIG. 6 shows multiple RFID tags coupled to multiple ICS's, according to an embodiment of the invention. The illustrated embodiment of FIG. 6 shows two RFID tag circuits 611, 612 (labeled TC 1 and TC 2, respectively), each coupled to a separate ICS 621, 622 (labeled ICS 1 and ICS 2, respectively). The two RFID tag circuits, each with its associated ICS, may share a common antenna 616. The two ICS's may be oriented such that the axes of the ICS's are substantially parallel to each other, but with each ICS sensing inertial force in an opposite direction from the other. Thus, in any given situation, one ICS may have closed contacts while the other ICS may have open contacts. In this condition, when the RFID tag circuits are energized, only one RFID tag circuit will be operationally coupled to the antenna 616 at a time, and therefore able to transmit its identification number through the antenna 616, so the receiving RFID reader will be able to determine the orientation or acceleration of the object holding these devices (at least along one axis—multiple such dual combinations may be used to sense orientation or acceleration along multiple axes). Although the illustrated embodiment shows each ICS being used to connect or disconnect the antenna directly to the appropriate RFID tag circuit (using a technique such as that described for FIG. 5), any other feasible techniques (such as but not limited to the technique described in FIG. 3) may be used with the dual ICS/opposite-inertia configuration of FIG. 6 to assure that one and only one RFID tag circuit responds to the RFID reader.

Although the RFID antennas have been shown using various symbologies in the drawings, the specific symbologies used are only for ease of illustration and should not be interpreted to limit the type or shape of antennas that may be used in various embodiments of the invention.

Figure 7:
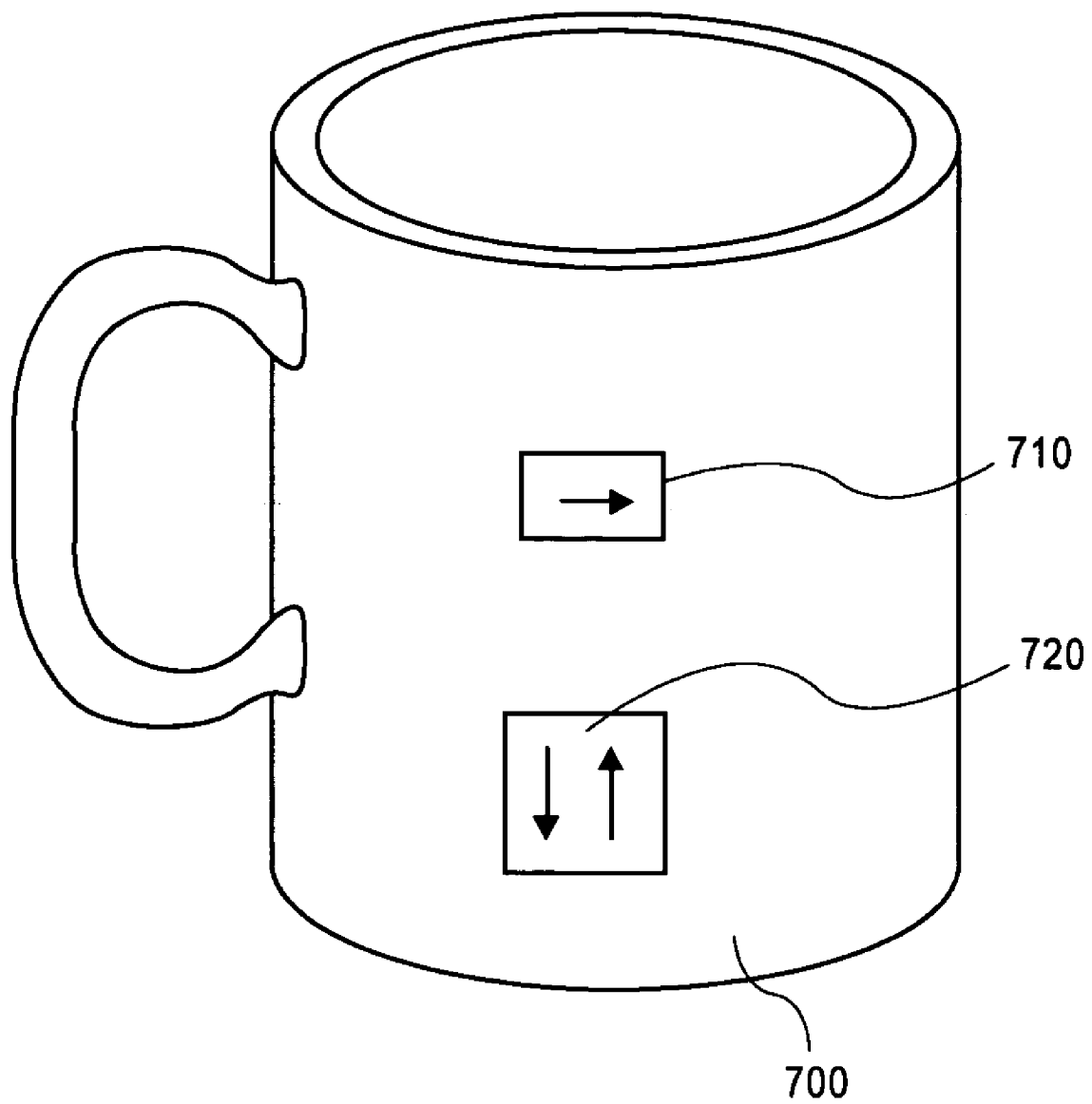
FIG. 7 shows RFID tags and inertially controlled switches attached to an object, according to an embodiment of the invention.

FIG. 7 shows RFID tags and ICS's attached to an object, according to an embodiment of the invention. In the embodiment shown, an object 700 (shown as a drinking cup for illustrative purposes, but it could be any suitable object) has two types of ICS/RFID tag combinations attached to it. In this example, item 710 may represent a single RFID tag with a single ICS which is mounted to sense acceleration along an axis that is slightly off horizontal. The ICS and RFID tag could be coupled to each other in any feasible electrical configuration, such as but not limited to the examples of FIGS. 2, 3, 4, or 5. For example, the ICS might be electrically open when the cup is motionless in the normal position shown, but would be momentarily closed if the cup were moved to the right or left because the force of acceleration (if initially moved to the left) or deceleration (if stopped after being moved to the right) would be more than enough to offset the slight component of gravity that operates on the ICS when the cup is motionless in the normal position. If this configuration were repeatedly polled by an RFID reader, the signals received by the reader could be used to determine if the cup were being moved. In a similar configuration, multiple ICS's may be used to sense motion or orientation along multiple axes. For example, three ICS's, each at approximately right angles to the other two, could be used to sense orientation in three dimensional space.

Item 720 may represent a dual ICS/RFID tag combination, such as that shown in FIG. 6, in which one, but not both, RFID tags would respond to a poll by an RFID reader. In the upright position shown in FIG. 7, one RFID tag would respond to a poll by an RFID reader, while the other RFID tag would respond if the cup were upside down. Although a drinking cup has been used to illustrate the above points, these principles may be used singly or in combination with a variety of objects to detect orientation and/or acceleration.

Figure 8:
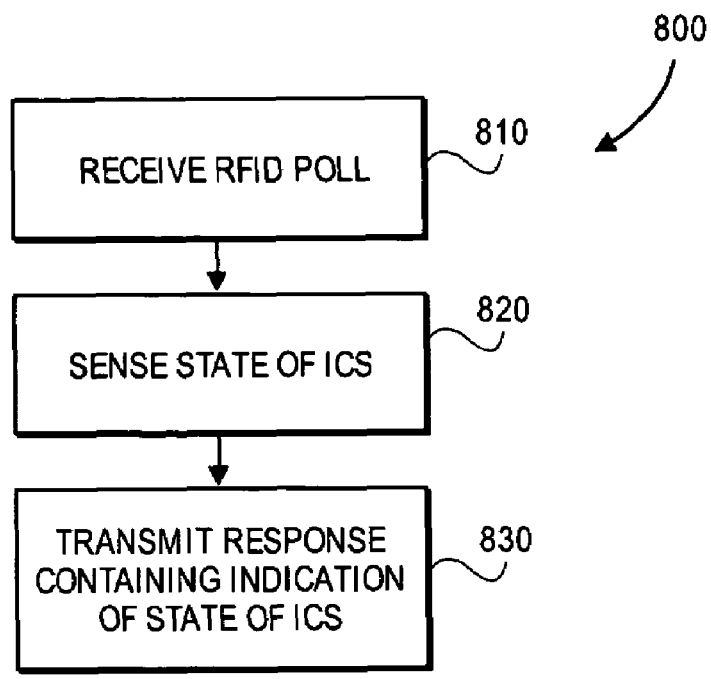
FIGS. 8 and 9 show flow diagrams of methods to be performed by an RFID tag, according to an embodiment of the invention.
Figure 9:
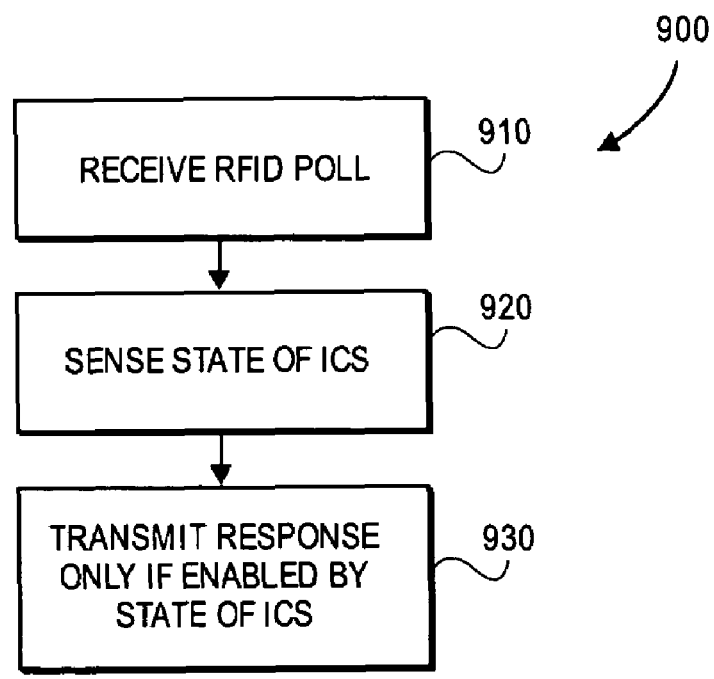

FIGS. 8 and 9 show flow diagrams of methods to be performed by an RFID tag, according to an embodiment of the invention. Flow diagram 800 assumes an RFID tag may transmit a response regardless of the state of the one or more ICS's connected to it, as may be the case with the configurations of FIG. 2 or 4. At 810 the RFID tag receives an RFID poll from an RFID reader. When the RFID tag is sufficiently energized, it may sense the state of one or more ICS's that are connected to it. 'Sensing' may comprise letting the state affect one or more bits in the RID tag, or letting the state select one of two or more identification numbers. At 830 the RFID tag may transmit a response to the RFID poll, with the contents of that response indicating the state(s) sensed for the one or more ICS's.

Flow diagram 900 assumes an RFID tag may transmit a response to indicate that the one or more ICS's are in a particular state or combination of states, while the RFID tag does not transmit a response if the one or more ICS's are not in that particular state or combination of states, as would be the case with the configurations of FIG. 3 or 5. In a similar manner to that previously described in FIG. 8, the RFID tag may receive a poll at 910 and sense the state of one or more ICS's at 920. However, the response may be transmitted at 930 only if the one or more ICS's are in a particular state or combination of states.

The method performed by the configuration of FIG. 6 might be considered a hybrid combination of the methods of FIGS. 8 and 9. Each individual RFID tag may respond to a poll or not respond to the poll based on the state of it's associated ICS, similar to the method of FIG. 9. But the pair of opposing RFID tags, as a coordinated unit, may respond to a poll by transmitting one of two responses, similar to the method of FIG. 8.

Figure 10:
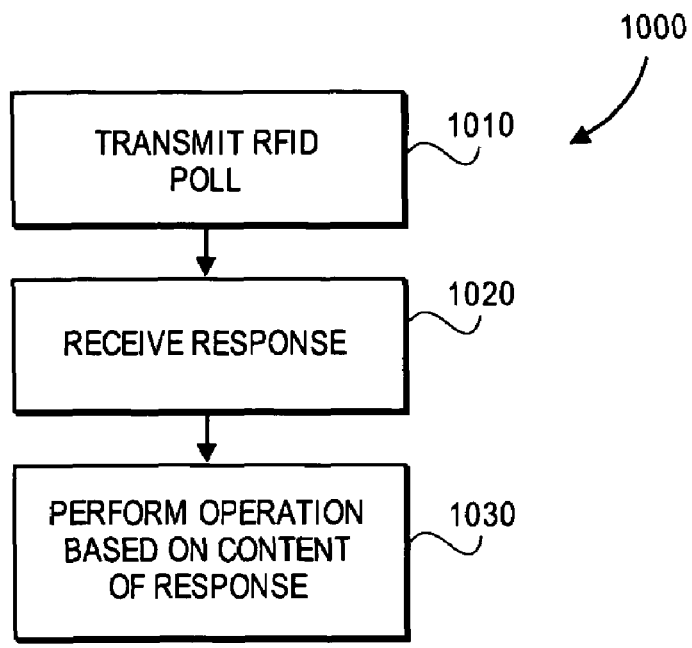
FIGS. 10-11 show flow diagrams of methods to be performed by an RFID reader and/or at least one associated system, according to an embodiment of the invention.
Figure 11:
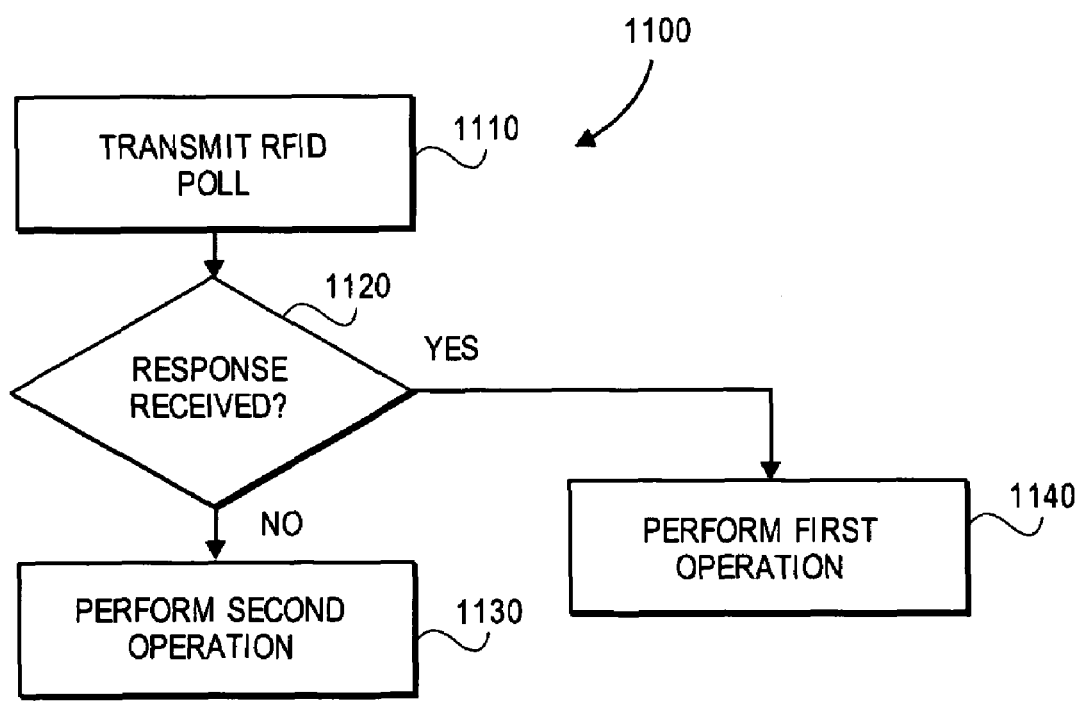
Figure 12A:
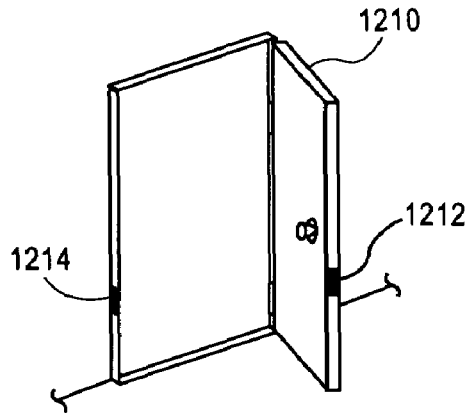
FIGS. 12A-E show how a mechanically or magnetically operated switch might be used to detect the open/close status of an object.
Figure 12B:
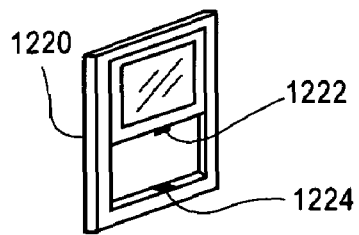
Figure 12C:
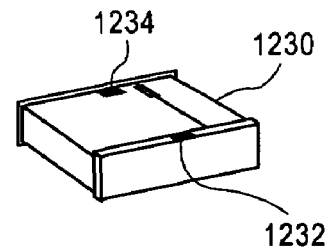
Figure 12D:
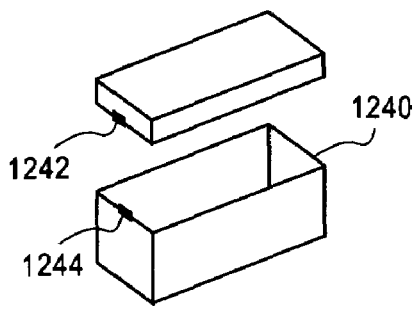
Figure 12E:
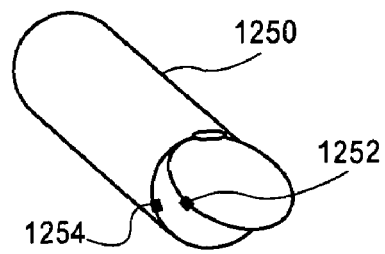

FIGS. 10 and 11 show flow diagrams of methods to be performed by an RFID reader and/or at least one associated system, according to an embodiment of the invention. Flow diagram 1000 assumes the polled RFID tag may transmit a response regardless of the state of the one or more ICS's connected to it, as may be the case with the RFID tag configurations of FIG. 2 or 4. At 1010 the RFID reader transmits an RFID poll, and at 1020 the RFID reader receives a response from an RFID tag. The reader and/or at least one associated system may examine the contents of the received response, and may perform an operation based on the contents of that response. The method of FIG. 10 may also be applicable when the RFID tag configuration of FIG. 6 is being used, since a response may be expected regardless of the states of the relevant ICS's.

Flow diagram 1100 assumes an RFID tag may transmit a response to indicate that the one or more ICS's are in a particular state or combination of states, while the RFID tag does not transmit a response if the one or more ICS's are not in that particular state or combination of states, as may be the case with the configurations of FIG. 3 or 5. In a similar manner to that previously described in FIG. 10 the RFID reader may transmit a poll at 1110. At 1120, if a response to the poll is received from a particular RFID tag within a designated time (since any response may be expected to occur within a designated time, there should be a limit on how long to wait for the response), the RFID reader and/or an associated system may perform a first operation at 1140. However, if no response is received within the designated time, the RFID reader and/or associated system may perform a second operation at 1130. The exact nature of the operations performed by the RFID reader and/or associated systems may be highly dependent on the particular application of the system, and are not discussed here to avoid obscuring an understanding of the various embodiments of the invention.

As an alternative to the inertially controlled switches previously described, other types of electrical switches may be coupled to an RFID tag so that the state of those switches may be transmitted to an RFID reader. Such a switch may be of any feasible type, such as but not limited to: mechanically activated switch, magnetically activated switch, and thermally activated switch. Such a switch may be a single- or multiple-throw switch, and may be a single- or multiple-pole switch, with multiple output contacts of the switch(es) corresponding to multiple bits, respectively, in the transmission from the RFID tag. In some embodiments, each binary switch status may be coupled to a separate bit in the response to be transmitted by the RFID tag (such as shown in FIG. 2), so that multiple switch positions may be transmitted in a single response. In some embodiments the status of multiple switches may be ORed and/or ANDed together, external to the RFID tag circuitry and/or internal to the RFID tag circuitry, so that the RFID tag transmits a combinatorial result to the RFID reader. Although FIG. 2 shows electrical voltage to the switches being provided by the RFID tag, in some embodiments a separate power source may provide voltage to the switches. Although some of the drawings depict inertially controlled switches, duplicate drawings for mechanically, magnetically, or thermally activated switches have not been shown because such additional detail is not needed for a person of ordinary skill in the art to understand the various embodiments of the invention.

The switches may be used in any feasible application. For example, FIGS. 12A-E show how a mechanically or magnetically operated switch might be used to detect the open/close status of an object. FIGS. 12A-12E show a door, a window, a drawer, a container with a lid, and a vent tube with a vent cover, respectively. In the examples shown, items 1214, 1224, 1234, 1244, and 1254 may comprise a switch that senses the open/close position. Items 1212, 1222, 1232, 1242, and 1252 may comprise a magnet used to active the switches 1214, 1224, 1234, 1244, and 1254, respectively, if those switches are magnetically activated when the object is in a closed position. Alternately, items 1212, 1222, 1232, 1242, and 1252 may comprise a simple surface or mechanical device to activate the switches if those switches are mechanically activated. These objects are shown as examples, but many other types of applications may also be encompassed by various embodiments of the invention. In still other applications, multiple switch bits may be used to detect the position of a device having a range of settings. A thermally operated switch may be used to detect a temperature threshold.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. A method, comprising:
    performing an operation based on a response to a poll by a radio frequency identification (RFID) reader;
    wherein the response indicates a state of an electrical switch coupled to an RFID tag; and
    wherein said performing comprises performing the operation if the response was received by the RFID reader within a designated time, and not performing the operation if the response was not received by the RFID reader within the designated time.

2. The method of claim 1, wherein said performing the operation comprises performing a first operation if contents of the response indicate the switch is in a first state and performing a second operation if the contents of the response indicate the switch is in a second state.

3. An article comprising
    a tangible machine-readable medium that provides instructions, which when executed by one or more processors, cause said one or more processors to perform operations comprising:
    performing an operation based on a response to a poll by a radio frequency identification (RFID) reader;
    wherein the response indicates a state of an electrical switch coupled to an RFID tag; and
    wherein said performing comprises performing the operation if the response was received by the RFID reader within a designated time, and not performing the operation if the response was not received by the RFID reader within the designated time.

4. The article of claim 3, wherein said performing the operation comprises performing a first operation if contents of the response indicate the switch is in a first state and performing a second operation if the contents of the response indicate the switch is in a second state.

* * * * *